United States Patent
Matsukawa et al.

(10) Patent No.: US 8,345,567 B2
(45) Date of Patent: Jan. 1, 2013

(54) ROUTE DATA COLLECTION TECHNIQUE IN NETWORK

(75) Inventors: Kazumasa Matsukawa, Kawasaki (JP); Tsuyoshi Harada, Kawasaki (JP); Hisashi Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 244 days.

(21) Appl. No.: 12/559,198

(22) Filed: Sep. 14, 2009

(65) Prior Publication Data

US 2010/0002694 A1    Jan. 7, 2010

Related U.S. Application Data (63) Continuation of application No. PCT/JP2007/055424, filed on Mar. 16, 2007.

(51) Int. Cl.
*H04L 12/56* (2006.01)
(52) U.S. Cl. .................. 370/252; 370/392; 370/401
(58) Field of Classification Search .................. None
See application file for complete search history.

(56) References Cited

U.S. PATENT DOCUMENTS

| | | | |
|---|---|---|---|
| 6,538,997 B1 * | 3/2003 | Wang et al. | 370/241 |
| 6,775,243 B1 * | 8/2004 | Valentine et al. | 370/255 |
| 6,952,421 B1 * | 10/2005 | Slater | 370/401 |
| 7,149,794 B1 * | 12/2006 | Attili et al. | 709/223 |
| 7,420,927 B1 * | 9/2008 | Garakani et al. | 370/242 |
| 7,957,364 B2 * | 6/2011 | Loyd et al. | 370/351 |
| 2003/0145105 A1 * | 7/2003 | Desineni et al. | 709/238 |
| 2005/0152399 A1 * | 7/2005 | Chu et al. | 370/469 |
| 2006/0013142 A1 * | 1/2006 | Hongal et al. | 370/248 |
| 2006/0209819 A1 * | 9/2006 | Jennings et al. | 370/389 |
| 2007/0147261 A1 * | 6/2007 | Schumacher et al. | 370/248 |

FOREIGN PATENT DOCUMENTS

JP        A 2004-208068        7/2004

OTHER PUBLICATIONS

G. Kessler et al., "A Primer on Internet and TCP/IP Tools and Utilities;" Network Working Group; Obsoletes: RFC 1739, IETF Standard, Internet Engineering Task Force, Jun. 1997.

* cited by examiner

*Primary Examiner* — Hassan Phillips
*Assistant Examiner* — Duc Duong
(74) *Attorney, Agent, or Firm* — Greer, Burns & Crain, Ltd.

(57) ABSTRACT

A route data collection method includes: a transmission source apparatus transmitting a request packet to request at least layer-2 apparatuses on a route to a destination apparatus to reply a response packet including predetermined setting data of the layer-2 apparatus to the transmission source apparatus; upon receiving the request packet, the layer-2 apparatus that can respond to the request packet, reading out the predetermined setting data stored in a storage device of the layer-2 apparatus, transmitting the response packet including the predetermined setting data to the transmission source apparatus, and outputting the request packet to the destination apparatus; and upon receiving the response packet, the transmission source apparatus displaying the predetermined setting data included in the response packet on a display device.

1 Claim, 9 Drawing Sheets

```
C:¥>tracert 10.0.2.5
Tracing L2 route to 10.0.2.5
over a maximum of 30 hops:

1   <1 ms   <1 ms   <1 ms
      VLAN147 VLAN147 VLAN147 10.35.147.254 (ca01L201/Catalyst2960)    } LAYER-3 APPARATUS 2   <1 ms   <1 ms   <1 ms
      VLAN10  VLAN10  VLAN10    10.35.128.30 (ca03L205/Catalyst2960)
                                00:15:FA:58:A6:33
  3   2 ms    1 ms    1 ms
      VLAN10  VLAN10  VLAN10    10.35.128.20 (ca03L226/SR-S224TC2)    } LAYER-2 APPARATUS ETC.
                                00:16:47:DE:1C:22
  4   2 ms    2 ms    2 ms
      VLAN10  VLAN10  VLAN10    10.35.128.10 (ca03L226/Summit400)
                                00:15:62:88:0A:11

5   3 ms    3 ms    4 ms
      VLAN22  VLAN22  VLAN22    10.0.2.5 (ca05L202/Catalyst3750G)     } LAYER-3 APPARATUS Trace complete.
C:¥>
```

FIG.12

```
C:¥>tracert 10.0.2.5
Tracing L2 route to 10.0.2.5
over a maximum of 30 hops:

1   <1 ms   <1 ms   <1 ms
      VLAN147 VLAN147 VLAN147 10.35.147.254 (ca01L201/Catalyst2960)    } LAYER-3 APPARATUS 2   <1 ms   <1 ms   <1 ms
      VLAN10  VLAN10  VLAN10    [10.35.128.100] (ca03L205/Catalyst2960)
                                [00:15:FA:58:B6:00]
  3   2 ms    1 ms    1 ms
      VLAN10  VLAN10  VLAN10    [10.35.128.90] (ca03L226/SR-S224TC2)   } LAYER-2 APPARATUS ETC.
                                [00:16:47:DE:2C:99]
  4   2 ms    2 ms    2 ms
      VLAN10  VLAN10  VLAN10    [10.35.128.80] (ca03L226/Summit400)
                                [00:15:62:88:0A:88]

5   3 ms    3 ms    4 ms
      VLAN22  VLAN22  VLAN22    10.0.2.5 (ca05L202/Catalyst3750G)     } LAYER-3 APPARATUS Trace complete.
C:¥>
```

FIG.13

ROUTE DATA COLLECTION TECHNIQUE IN NETWORK

CROSS-REFERENCE TO RELATED APPLICATIONS

This application is a continuing application, filed under 35 U.S.C. section 111(a), of International Application PCT/JP2007/055424, filed Mar. 16, 2007.

FIELD

This technique relates to a network communication technique.

BACKGROUND

In a conventional art, for example, a response of an IP address is obtained by a traceroute command defined in RFC 2151 from a layer-3 apparatus (which is one of network relay apparatuses and an apparatus to determine a destination of packets based on data in a network layer (i.e. third layer) of the Open System Interconnection (OSI) standard model and to transfer the packets to the destination. For example, a router, L3-switch or the like), and a communication route is detected base on the obtained data.

Figure 1:
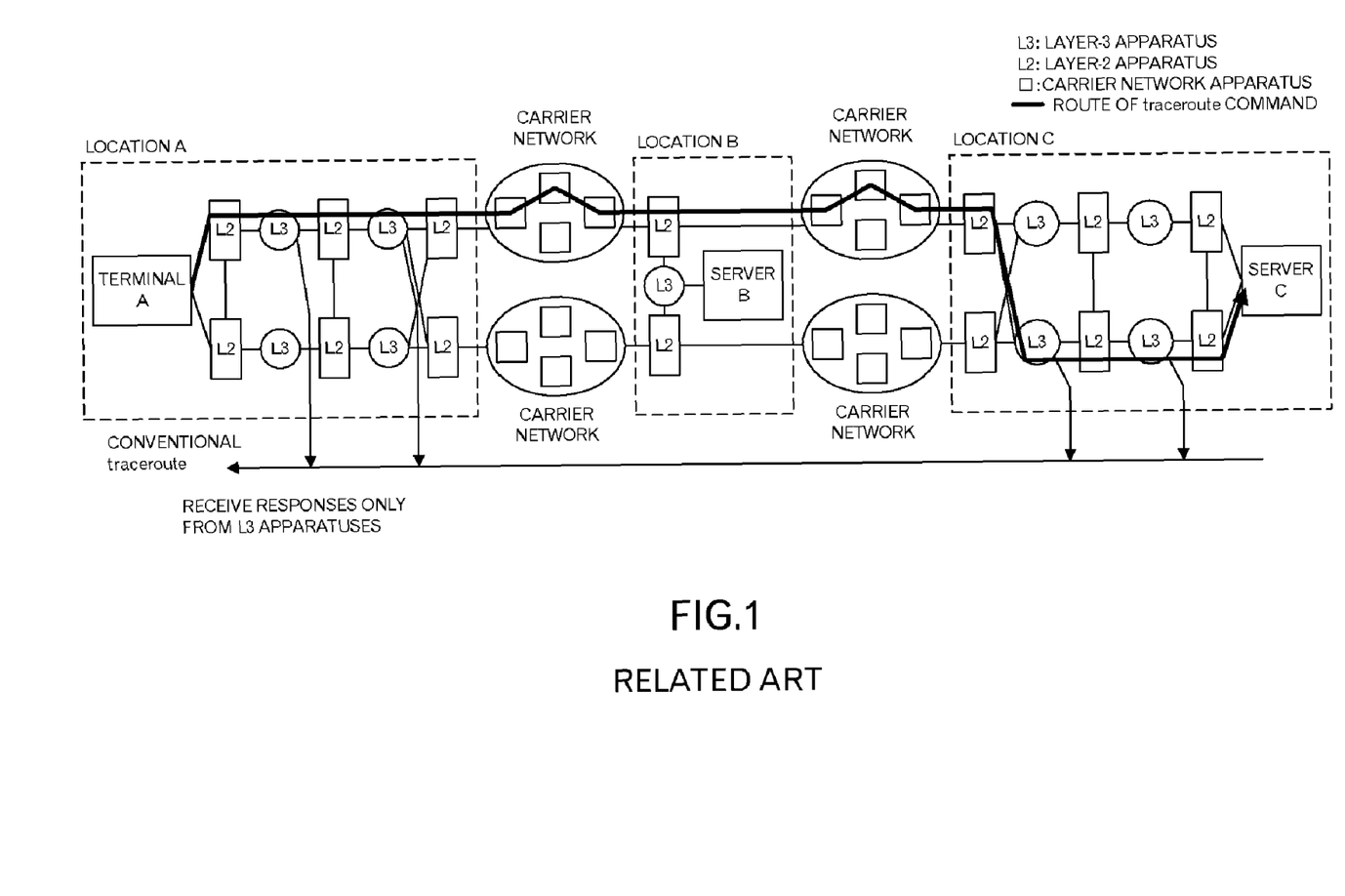
FIG. 1 is a diagram to explain problems in a conventional art.

However, as depicted in FIG. 1, on the actual communication route (depicted by a thick line) from a terminal A at a location A to a server C at a location C, a switching hub, which is a layer-2 apparatus (which is one of network relay apparatuses, and an apparatus to determine a destination of packets by data in the data link layer (i.e. second layer) of the OSI standard model and transfer the packets to the destination), a carrier network apparatus (represented by square marks depicted in FIG. 1) and the like actually exist in addition to the layer-3 apparatus. However, they do not support a response function to the traceroute command. Namely, on the communication route depicted by the thick line, only the layer-3 apparatuses depicted as "L3" respond to the traceroute command. Therefore, it is impossible to accurately grasp the actual communication route, and this problem makes a long time required to detect the causes of the failures and to cope with capability problems.

Namely, the conventional art cannot collect a lot of information concerning apparatuses, which exist on the communication route.

In addition, the conventional art does not disclose any layer-2 apparatus that can reply predetermined setting data to a transmission source of a newly defined command in response to the command.

Furthermore, the conventional art does not disclose any carrier network apparatus that can reply the predetermined setting data to the transmission source of the newly defined command in response to the command.

SUMMARY

According to a first aspect of this technique, a route data collection method includes: a transmission source apparatus transmitting a request packet to request at least layer-2 apparatuses on a route to a destination apparatus to reply a response packet including predetermined setting data of the layer-2 apparatus to the transmission source apparatus; upon receiving the request packet, the layer-2 apparatus that can respond to the request packet, reading out the predetermined setting data stored in a storage device of the layer-2 apparatus, transmitting the response packet including the predetermined setting data to the transmission source apparatus, and outputting the request packet to the destination apparatus; and upon receiving the response packet, the transmission source apparatus displaying the predetermined setting data included in the response packet on a display device.

According to a second aspect of this technique, a layer-2 apparatus includes: a storage device to store predetermined setting data; a receiver to receive a request packet to request at least layer-2 apparatuses on a route to a destination apparatus to reply a response packet including the predetermined setting data of the layer-2 apparatus to a transmission source apparatus; and a transmitter to read out the predetermined setting data stored in a storage device, transmit the response packet including the read predetermined setting data to the transmission source apparatus, and transmit the request packet to the destination apparatus.

Furthermore, according to a third aspect of this technique, a carrier network apparatus includes: a storage device to store predetermined setting data; a receiver to receive a request packet to request at least carrier network apparatuses on a route to a destination apparatus to reply a response packet including the predetermined setting data of the carrier network apparatus to a transmission source apparatus; and a transmitter to read out the predetermined setting data stored in a storage device, transmit the response packet including the read predetermined setting data to the transmission source apparatus, and transmit the request packet to the destination apparatus. Moreover, according to a fourth aspect of this technique, a route data collection apparatus has a first unit to transmit a request to request at least layer-2 apparatuses on a route to a destination apparatus to reply a response packet including predetermined setting data of the layer-2 apparatus to the route data collection apparatus; and a second unit to display the predetermined setting data included in the response packet upon receiving the response packet from the layer-2 apparatus that can respond to the request packet.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 2:
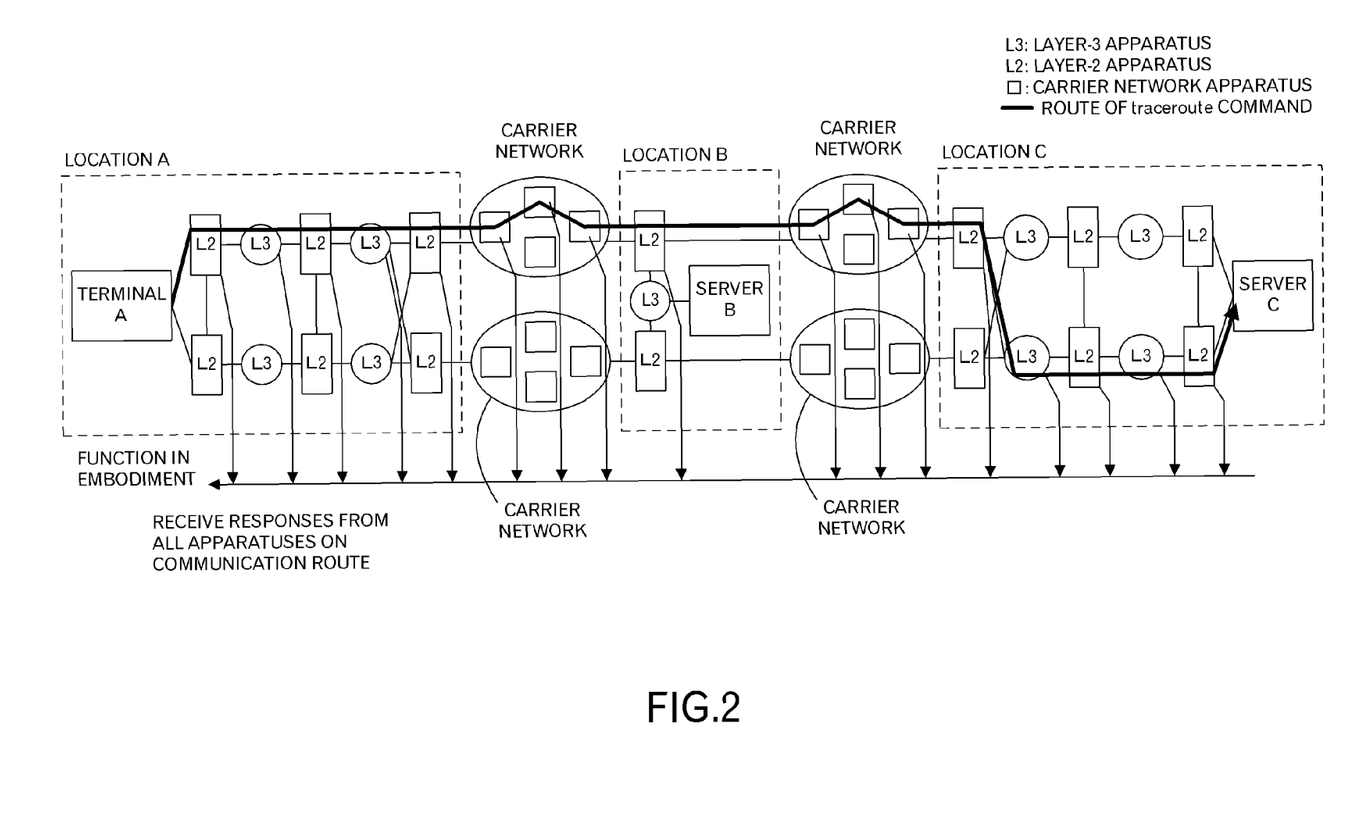
FIG. 2 is a network configuration diagram depicting an outline of this technique.

FIG. 2 depicts an outline of an embodiment of this technique. When a location A is connected to a location B through a carrier network, the location B is connected to a location C through the carrier network and a route between a terminal A in the location A and a server C in the location C is depicted by a thick line, this embodiment adds improvements described below in detail to layer-2 apparatuses, layer-3 apparatuses and carrier network apparatuses to make all of the apparatuses on the route reply a response to an extended traceroute command. Then, it becomes possible to confirm and consider what apparatuses construct the route, whether or not the route is appropriate and what setting is required.

Figure 3:
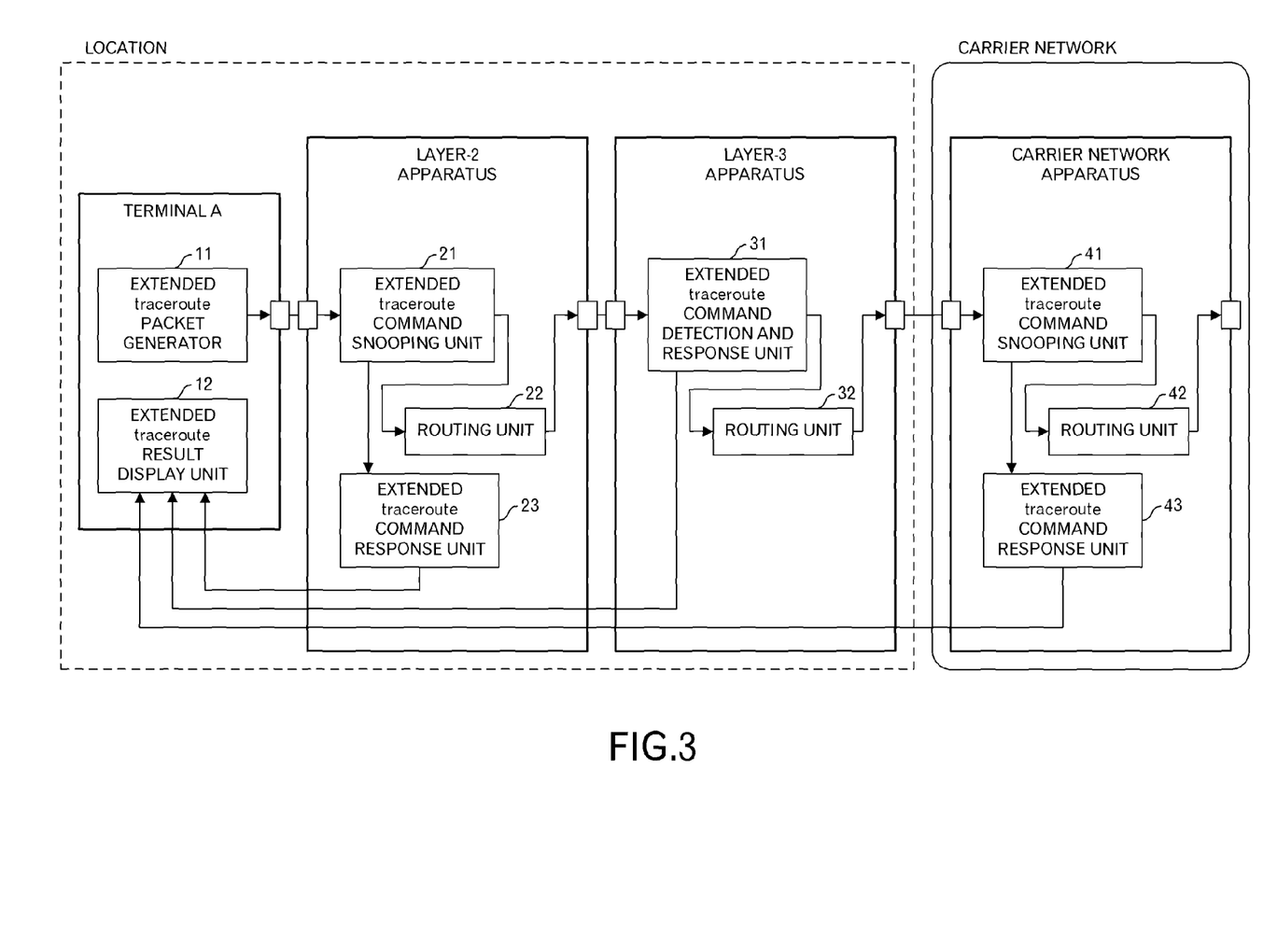
FIG. 3 is a functional block diagram of each apparatus relating to an embodiment of this technique.

Next, FIG. 3 depicts configurations of the terminal A, the layer-2 apparatus, the layer-3 apparatus and the carrier network apparatus, which are depicted in FIG. 2. As depicted in FIG. 3, the terminal A has an extended traceroute packet generator 11 and an extended traceroute result display unit 12. The layer-2 apparatus has an extended traceroute command snooping unit 21, a routing unit 22 and an extended traceroute command response unit 23. The layer-3 apparatus has an extended traceroute command detection and response unit 31 and routing unit 32. The carrier network apparatus has an extended traceroute command snooping unit 41, a routing unit 42 and an extended traceroute command response unit 43.

Figure 4:
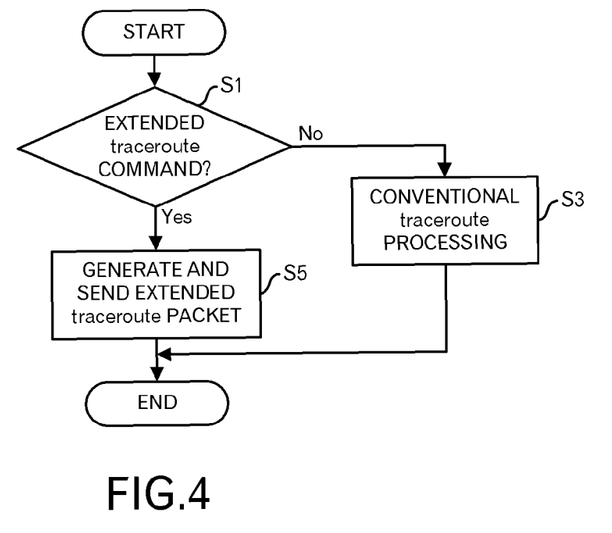
FIG. 4 is a diagram depicting a processing flow executed by an extended traceroute command generator in an apparatus.

Next, a processing executed by the extended traceroute packet generator 111 will be explained by using FIG. 4. First, for example, a user of the terminal A instructs an execution of an extended traceroute command in a format of "tracert destination IP address/MAC address [L2/C/all]". The designation of the destination IP address or MAC address is mandatory, and when causing only the layer-2 apparatuses to respond to the command, a L2 option is designated, when causing only the carrier network apparatuses to respond to the command, a C option is designated, and when causing all of the apparatuses to respond to the command, an all option is designated.

In response to the instruction from the user, the extended traceroute packet generator 11 judges whether or not the instruction indicates the extended traceroute command (step S1). When the instruction does not indicate the extended traceroute command, but indicates a conventional traceroute command, a conventional traceroute processing is carried out (step S3). Because the conventional traceroute processing is well-known, the detailed explanation is omitted. On the other hand, when the instruction indicates the extended traceroute command, the extended traceroute packet generator 11 generates an extended traceroute packet, and transmits the extended traceroute packet to any nearest relay apparatus (step S5). The extended traceroute packet includes information representing the extended traceroute command, a destination IP address or MAC address and information representing a designated option.

Figure 5:
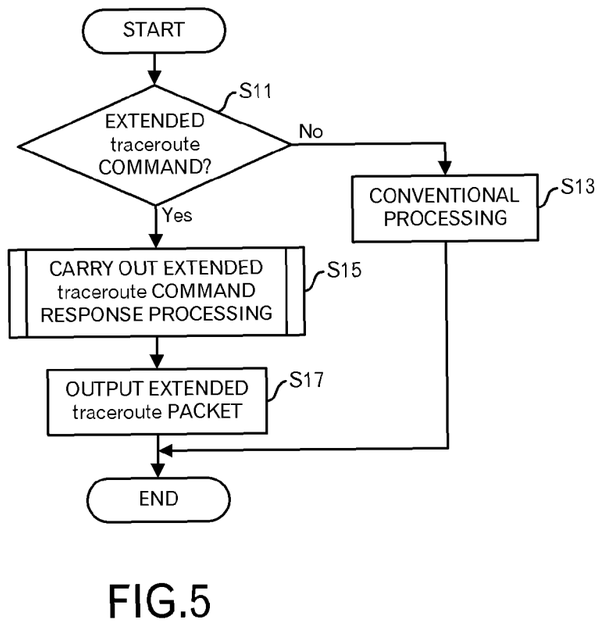
FIG. 5 is a diagram depicting a processing flow executed by an extended traceroute command snooping unit in a layer-2 apparatus.

Next, a processing executed by the extended traceroute command snooping unit 21 in the layer-2 apparatus will be explained by using FIG. 5. The extended traceroute command snooping unit 21 in the layer-2 apparatus inspects a received packet, and judges whether or not the received packet is the extended traceroute packet (step S11). When the received packet is not the extended traceroute packet but is other packet, the extended traceroute command snooping unit 21 causes the routing unit 22 to carry out a conventional processing (step S13). Namely, the extended traceroute packet outputs the received packet to the routing unit 22, and cause the routing unit 22 to transmit the received packet to a next relay apparatus.

On the other hand, when the received packet is the extended traceroute packet, the extended traceroute command snooping unit 21 causes the extended traceroute command response unit 23 to carry out an extended traceroute command response processing (step S15). In addition, the extended traceroute command snooping unit 21 outputs the received extended traceroute packet to the routing unit 22, and causes the routing unit 22 to transmit the extended traceroute packet to the next relay apparatus (step S17).

Figure 6:
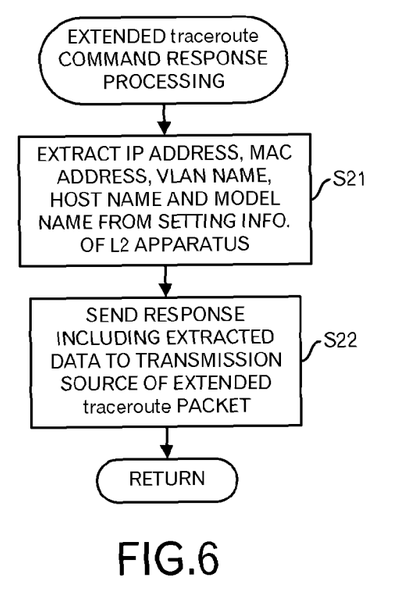
FIG. 6 is a diagram depicting a processing flow executed by an extended traceroute command response unit in the layer-2 apparatus.

Next, a processing executed by the extended traceroute command response unit 23 in the layer-2 apparatus will be explained by using FIG. 6. The extended traceroute command response unit 23 in the layer-2 apparatus extracts an IP address (if the IP address is allocated), a MAC address of a response interface, a Virtual LAN (VLAN) name, a host name and a model name from setting information of the layer-2 (L2) apparatus, which is stored in a storage device of the L2 apparatus (step S21). Then, the extended traceroute command response unit 23 transmits a response including the extracted data and the number of hops, which is included in the received extended traceroute packet, to the terminal A that is a transmission source of the extended traceroute packet, which is included in the received extended traceroute packet (step S23).

Figure 7:
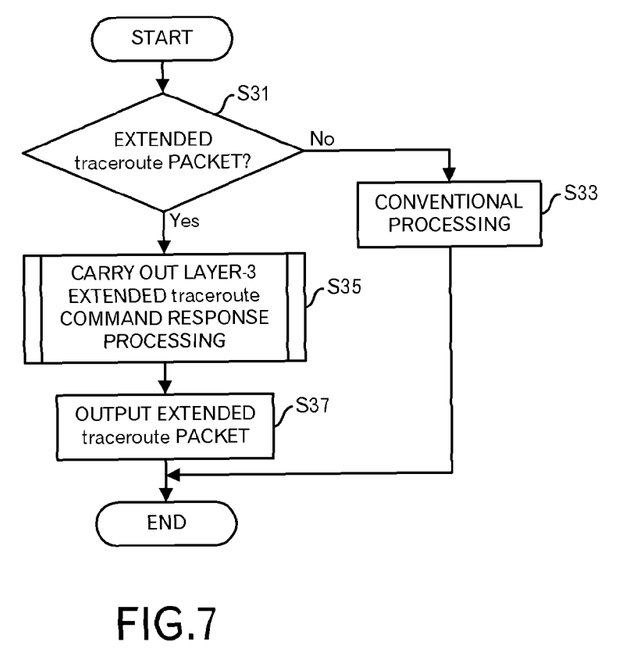
FIG. 7 is a diagram depicting a processing flow executed by an extended traceroute command detection and response unit in a layer-3 apparatus.

Next, a processing executed by the extended traceroute command detection and response unit 31 in the layer-3 apparatus will be explained by using FIG. 7. The extended traceroute command detection and response unit 31 in the layer-3 apparatus inspects the received packet, and judges whether or not the received packet is the extended traceroute packet (step S31). When the received packet is not the traceroute packet, but is other packet, the extended traceroute command detection and response unit 31 causes the routing unit 22 to carry out a conventional processing (step S33). Namely, the extended traceroute command detection and response unit 31 outputs the received packet to the routing 22, and causes the routing unit 22 to transmit the received packet to the next relay apparatus. Incidentally, when the received packet is the conventional traceroute packet, the IP address is read out from the storage device, and the IP address is transmitted to the terminal A, which is a transmission source.

On the other hand, when the received packet is the extended traceroute packet, the extended traceroute command detection and response unit 31 carries out a layer-3 extended traceroute command response processing (step S35). In addition, the extended traceroute command detection and response unit 31 outputs the received traceroute packet to the routing unit 32, and causes the routing unit 32 to transmit the extended traceroute packet to the next relay apparatus (step S37).

Figure 8:
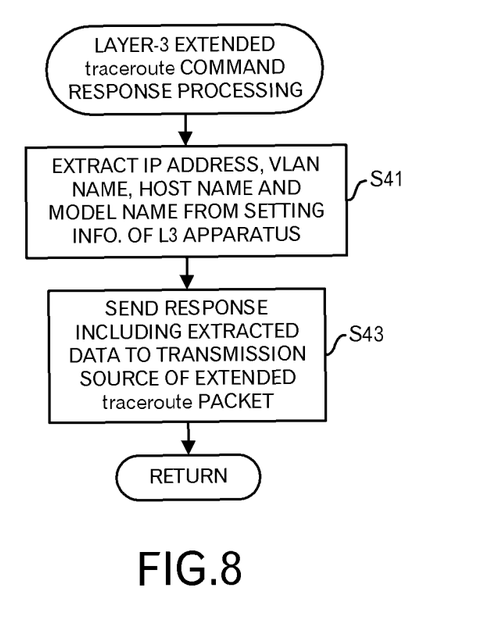
FIG. 8 is a diagram depicting a processing flow of a layer-3 extended traceroute command response processing.

Next, a layer-3 extended traceroute command response processing of the layer-3 apparatus will be explained by using FIG. 8. The extended traceroute command detection and response unit 31 in the layer-3 extracts an IP address, a VLAN name, a host name and a model name from setting information of the layer-3 (L3) apparatus, which is stored in a storage device of the L3 apparatus (step S41). Then, the extended traceroute detection and response unit 31 transmits a response including the extracted data and the number of hops, which is included in the extended traceroute packet, to the terminal A as the transmission source of the extended traceroute packet, which is included in the extended traceroute packet (step S43).

Figure 9:
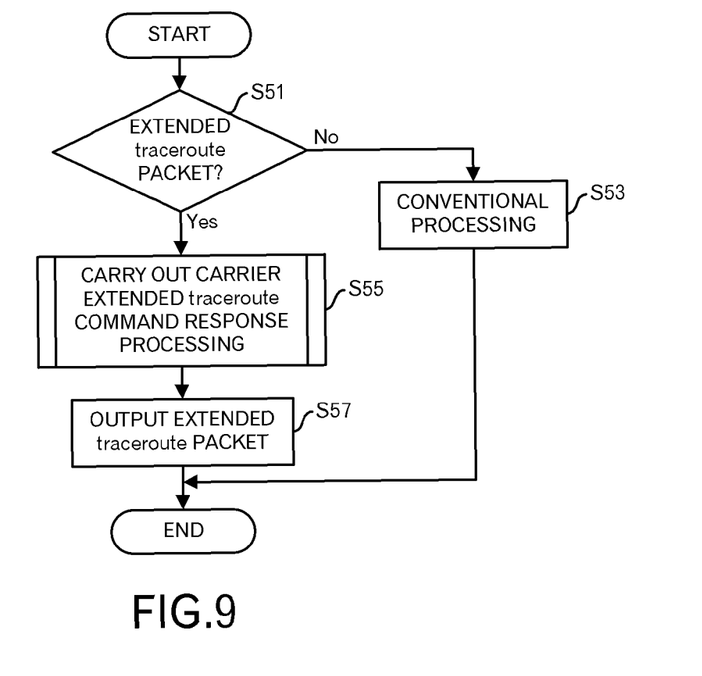
FIG. 9 is a diagram depicting a processing flow of an extended traceroute command snooping unit in a carrier network apparatus.

Next, a processing executed by the extended traceroute command snooping unit 41 in the carrier network apparatus will be explained by using FIG. 9. The extended traceroute command snooping unit 41 in the carrier network apparatus inspects the received packet, and judges whether or not the received packet is the extended traceroute packet (step S51). When the received packet is not the extended traceroute packet but is other packet, the extended traceroute command snooping unit 31 causes the routing unit 42 to carry out a conventional processing (step S53). Namely, the extended traceroute command snooping unit 41 outputs the received packet to the routing unit 42 and causes the routing unit 42 to transmit the received packet to the next relay apparatus.

On the other hand, when the received packet is the extended traceroute packet, the extended traceroute command snooping unit 41 causes the extended traceroute command response unit 42 in the carrier network apparatus to carry out a carrier extended traceroute command response processing (step S55). In addition, the extended traceroute command snooping unit 41 outputs the received extended traceroute packet to the routing unit 42, and causes the routing unit 42 to transmit the extended traceroute packet to the next relay apparatus (step S57).

Figure 10:
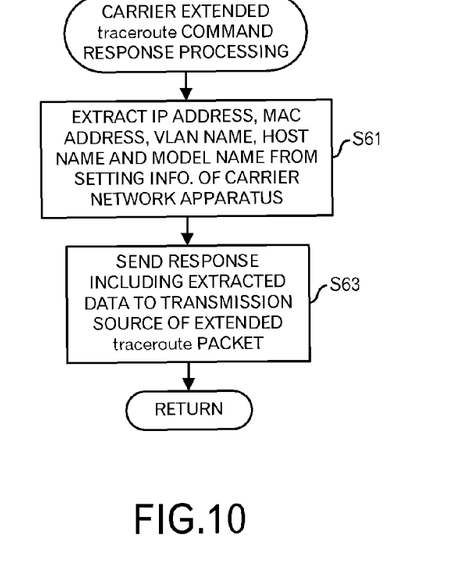
FIG. 10 is a diagram depicting a processing executed by an extended traceroute command response unit in the carrier network apparatus.

Next, a carrier extended traceroute command response processing executed by the extended traceroute command response unit 43 in the carrier apparatus will be explained by using FIG. 10. The extended traceroute command response unit 43 in the carrier network apparatus extracts an IP address, a MAC address, a VLAN name, a host name and a model name from setting information of the carrier network apparatus, which is stored in a storage device of the carrier network apparatus (step S61). Then, the extended traceroute command response unit 43 transmits a response including the extracted data and the number of hops, which is included in the extended traceroute packet, to the terminal A as a transmission source of the extended traceroute packet, which is included in the extended traceroute packet (step S63).

Figure 11:
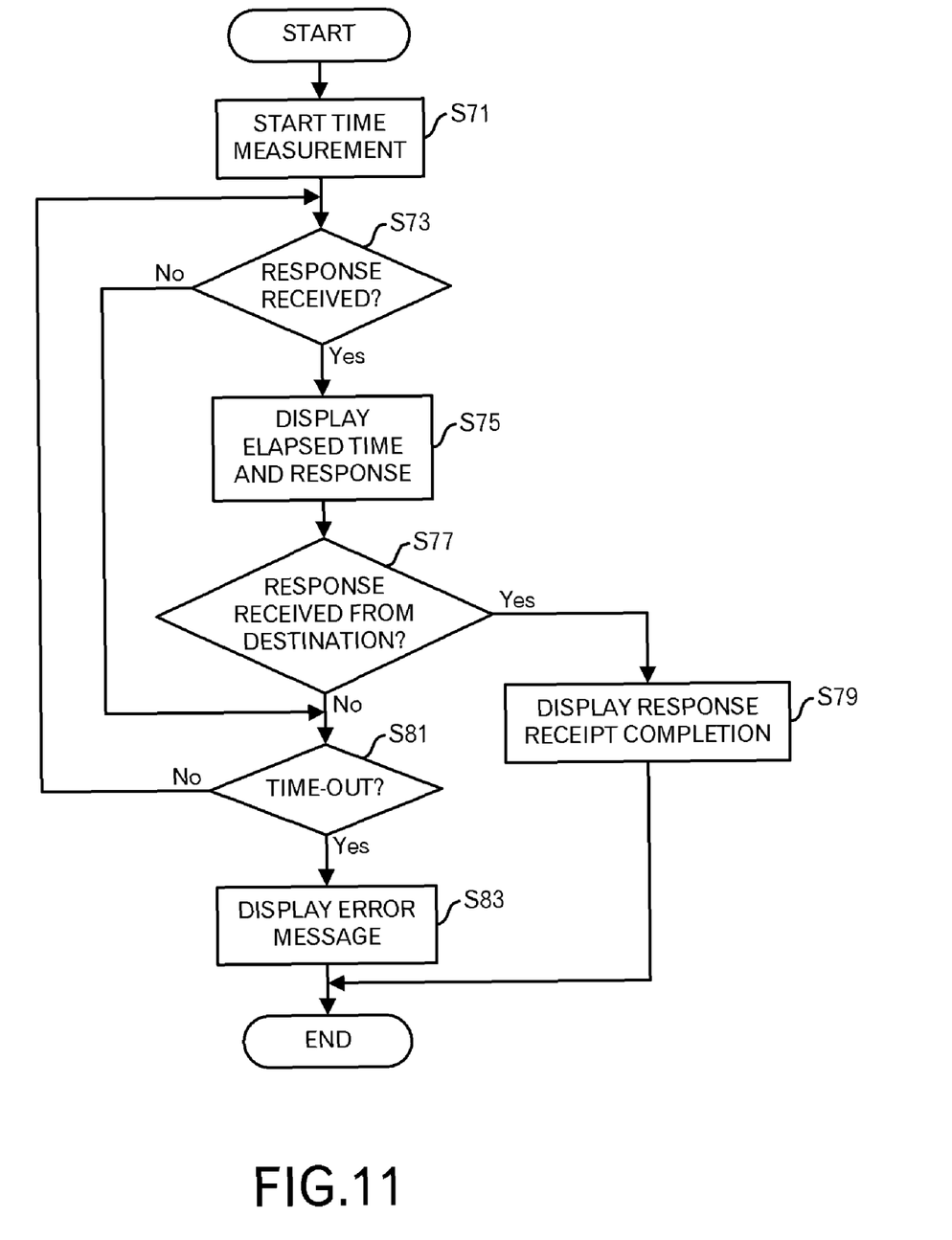
FIG. 11 is a diagram depicting a processing flow executed by an extended traceroute result display unit in the apparatus.

By carrying out the aforementioned processing in the respective apparatuses, the responses are transmitted to the terminal A, which is the transmission source. Then, the extended traceroute result display unit 12 of the terminal A carries out a processing as depicted in FIG. 11. First, the extended traceroute result display unit 12 starts time measurement in response to an input of the extended traceroute command by the user (step S71). Then, when a response from an apparatus on the route is received (step S73: Yes route), the extended traceroute result display unit 12 displays an elapsed time from the step S71 to the receipt of the response and contents of the responses onto the display device (step S75). After that, the extended traceroute result display unit 12 judges whether or not the response from the destination of the extended traceroute packet is received (step S77). Namely, the extended traceroute result display unit 12 judges whether or not the response including, as the transmission source, the IP address or MAC address, which is identical to the destination IP address or MAC address of the extended traceroute packet.

When the response from the destination of the extended traceroute packet is received, the extended traceroute result display unit 12 displays response receipt completion onto the display device (step S79). Then, the processing is completed. Incidentally, in a case where the maximum number of hops is defined, the extended traceroute result display unit 12 judges whether or not the number of hops, which is included in the response, reaches the maximum number of hops, the processing may be terminated. On the other hand, when the response from the destination of the extended traceroute packet is not received, the extended traceroute result display unit 12 judges based on the elapsed time from the step S71, whether or not a time-out occurs (step S81). When the time-out does not occur, the processing returns to the step S73.

Similarly, when any response from the apparatuses on the route is not received, the extended traceroute result display unit 12 judges whether or not the time-out occurs (step S81). When the time-out does not occur, the processing returns to the step S73.

On the other hand, when it is judged that the time-out occurs, the extended traceroute result display unit 12 displays an error message and ends the processing (step S83).

Figure 12:
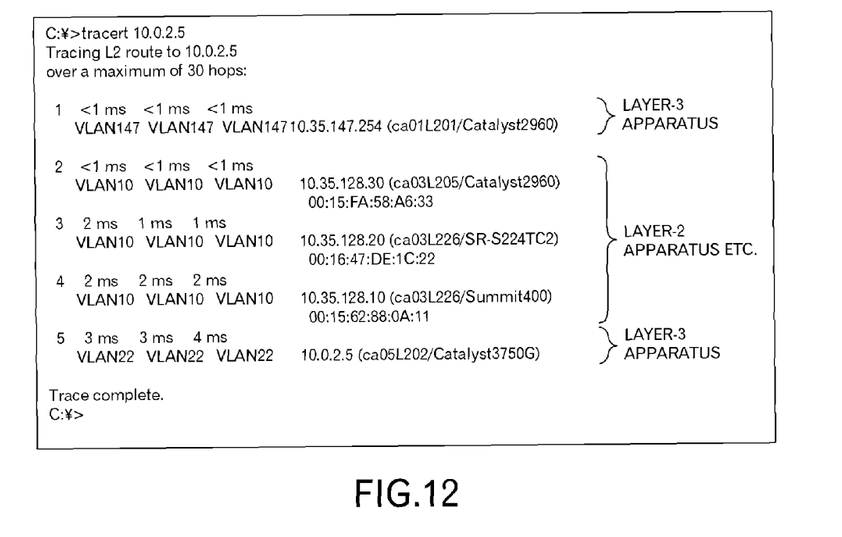
FIG. 12 is a diagram depicting a display example of a processing result of the extended traceroute command.

When such a processing is carried out, data as depicted in FIG. 12 is displayed. In an example of FIG. 12, the IP address of the destination apparatus is "10.0.2.5", and when an output of the extended traceroute command is instructed once, three extended traceroute packets are transmitted. In the example of FIG. 12, an apparatus whose number of hops is "1" is a layer-3 apparatus whose VLAN ID is "147", whose IP address is "10.35.147.254", whose host name is "ca01L201" and whose model name is "Catalyst2960". In addition, an apparatus whose number of hops is "2" is a layer-2 apparatus whose VLAN ID is "10", whose IP address is "10.35.128.30", whose MAC address is "00:15:FA:58:A6:33", whose host name is "ca03L205" and whose model name is "Catalyst2960". An apparatus whose number of hops is "3" is a layer-2 apparatus whose VLAN ID is "10", whose IP address is "10.35.128.20", whose MAC address is "00:16:47:DE:1C:22", whose host name is "ca03L226" and whose mode name is "SR-S224TC2". An apparatus whose number of hops is "4" is a layer-2 apparatus whose VLAN ID is "10", whose IP address is "10.35.128.10", whose MAC address is "00:15:62:88:0A:11", whose host name is "ca0L226" and whose model name is "Summit400". An apparatus whose number of hops is "5" is a destination and Layer-3 apparatus whose VLAN ID is "22" and whose IP address is "10.0.2.5". Then, the response receipt completion is displayed by a message "Trace completed". In case of the time-out, other message is displayed. In this example, it can be grasped that the route passes through the layer-2 apparatus network in the VLAN whose ID is 10.

In addition, by collating the host name or model name with the network configuration diagram or the like, it is possible to judge the suitability of the communication route. Namely, it is possible to evaluate whether or not the route is set as desired and designed.

Figure 13:
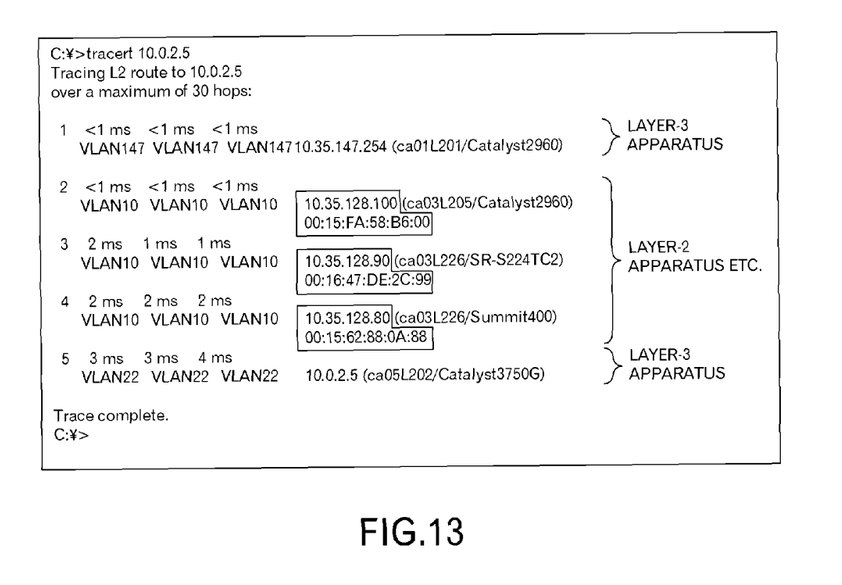
FIG. 13 is a diagram depicting another display example of a processing result of the extended traceroute command.

In addition, when the route as depicted in FIG. 12 is for an actually operating system and setting change or failure occurs, a route as depicted in FIG. 13 may be set. In an example of FIG. 13, redundant configuration is adopted in the VLAN whose ID is 10, and additional layer-2 apparatuses whose IP addresses are "10.35.128.80", "10.35.128.90" and "10.35.128.100" are provided and used. Also in such a case, by executing the extended traceroute command relating to this embodiment, it is possible to also grasp the route configuration as to the layer-2 apparatus in the VLAN whose ID is 10. Therefore, when any problem occurred, setting change or the like may be conducted, and configuration change also may be realized so as to use appropriate apparatuses.

Although the embodiments are described above, this technique is not limited to these embodiments. For example, the functional block diagram depicted in FIG. 3 is a mere example, and does not always correspond to an actual program module configuration. In addition, the functions may be implemented by hardwares and may be implemented by programs such as firmwares, and further may be implemented a combination of the hardware and software.

In the explanation described above, it is presupposed that all of the apparatuses on the network have the aforementioned functions by the improvements. However, not all of the apparatuses may not have the aforementioned functions, and a portion of the apparatuses may have the aforementioned functions. Even in such a case that a portion of the apparatuses on the route has the aforementioned functions and can be grasped, a large effect can be obtained.

Figure 14:
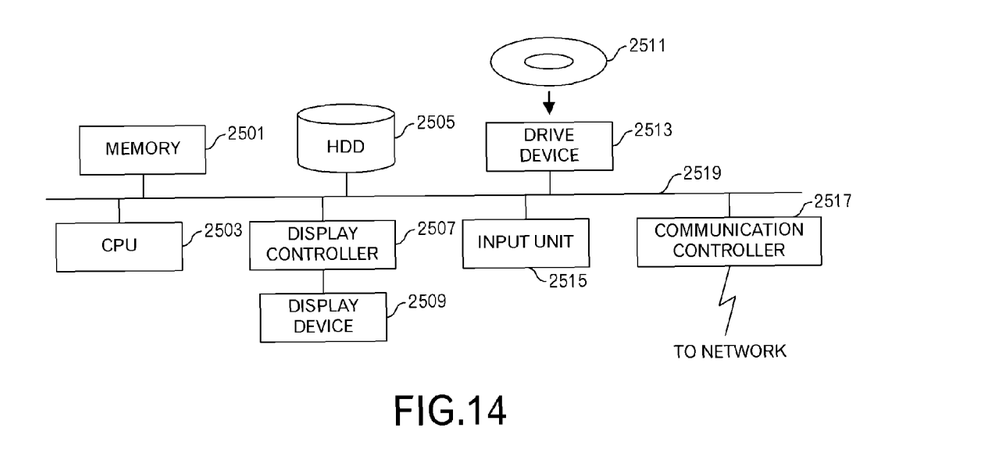
FIG. 14 is a functional block diagram of a computer.

In addition, the terminal A, the layer-2 apparatus, the layer-3 apparatus and the carrier network apparatus may be computer devices as shown in FIG. 14. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 14. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The embodiments are outlined as follows:

According to a first viewpoint of the embodiments, a route data collection method includes: a transmission source apparatus transmitting a request packet to request at least layer-2 apparatuses on a route to a destination apparatus to reply a response packet including predetermined setting data of the layer-2 apparatus to the transmission source apparatus; upon receiving the request packet, the layer-2 apparatus that can respond to the request packet, reading out the predetermined setting data stored in a storage device of the layer-2 apparatus, transmitting the response packet including the predetermined setting data to the transmission source apparatus, and outputting the request packet to the destination apparatus; and upon receiving the response packet, the transmission source apparatus displaying the predetermined setting data included in the response packet on a display device. Thus, it is possible to receive the predetermined setting data also from the layer-2 apparatus, and consider apparatuses on the route.

Incidentally, the aforementioned setting data may include address information and model information of the layer-2 apparatus. When including the address information and the model information, it is possible to identify which route is used based on a network configuration diagram or the like, and to conduct necessary countermeasures.

In addition, the aforementioned predetermined setting data may include VLAN data.

Furthermore, the aforementioned address information may at least either of an IP address and a MAC address. In case of the layer-2 apparatus, no IP address may be allocated. However, in such a case, the MAC address is allocated.

In addition, the aforementioned request packet may be a request packet to further request carrier network apparatuses on the route to the destination apparatus to reply the response packet including the predetermined setting data of the carrier network apparatus to the transmission source apparatus. In such a case, the first viewpoint may further include: the carrier network apparatus that can respond to the request packet, reading out the predetermined setting data stored in a storage device in the carrier network apparatus, transmitting the response packet including the predetermined setting data, and outputting the request packet to the destination apparatus.

By carrying out such a processing, it becomes possible to also collect data regarding the carrier network apparatus. Furthermore, in the displaying, the predetermined setting data included in the response packet may be listed in order of the number of hops, which is included in the response packet. Thus, it is possible to easily grasp the route.

According to a second viewpoint of the embodiments, a layer-2 apparatus includes: a storage device to store predetermined setting data; a receiver to receive a request packet to request at least layer-2 apparatuses on a route to a destination apparatus to reply a response packet including the predetermined setting data of the layer-2 apparatus to a transmission source apparatus; and a transmitter to read out the predetermined setting data stored in a storage device, transmit the response packet including the read predetermined setting data to the transmission source apparatus, and transmit the request packet to the destination apparatus.

Furthermore, according to a third viewpoint of the embodiments, a carrier network apparatus includes: a storage device to store predetermined setting data; a receiver to receive a request packet to request at least carrier network apparatuses on a route to a destination apparatus to reply a response packet including the predetermined setting data of the carrier network apparatus to a transmission source apparatus; and a transmitter to read out the predetermined setting data stored in a storage device, transmit the response packet including the read predetermined setting data to the transmission source apparatus, and transmit the request packet to the destination apparatus.

Moreover, according to a fourth viewpoint of the embodiments, a route data collection apparatus has a first unit to transmit a request to request at least layer-2 apparatuses on a route to a destination apparatus to reply a response packet including predetermined setting data of the layer-2 apparatus to the route data collection apparatus; and a second unit to display the predetermined setting data included in the response packet upon receiving the response packet from the layer-2 apparatus that can respond to the request packet.

Incidentally, it is possible to create a program used to realize the layer-2 apparatus, the carrier network apparatus or the route data collection apparatus, and this program is stored into such a computer-readable storage medium or a storage apparatus such as a flexible disk, a CD-ROM, a magneto-optical disk, a semiconductor memory, or a hard disk. In addition, an intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A system, comprising;
    a computer; and
    a network including a plurality of layer-2 apparatuses and a plurality of layer-3 apparatuses, and
    wherein, in response to an instruction from a user of said computer to collect data from first layer-2 apparatuses of the plurality of layer-2 apparatuses and first layer-3 apparatuses of the plurality of layer-3 apparatuses on a route to a destination apparatus, said computer transmits a first request packet to request said first layer-2 apparatuses and said first layer-3 apparatuses to transmit a first response packet including first predetermined setting data in said first layer-2 apparatuses and said first layer-3 apparatuses to said computer, and
    in response to an instruction from a user of said computer to collect data from second layer-3 apparatuses of the plurality of layer-3 apparatuses on a route to said destination apparatus, said computer transmits a second request packet to request said second layer-3 apparatuses to transmit a second response packet including second predetermined setting data in said second layer-3 apparatuses to said computer, and
    in response to said first response packet or said second response packet, said computer displays said first predetermined setting data included in said first response packet or said second predetermined setting data included in said second response packet on a display device, and
    in response to said first request packet, one of said first layer-2 apparatuses reads out said first predetermined setting data stored in a storage device of said one of first layer-2 apparatuses, transmits said first response packet including the read first predetermined setting data to said computer, and transmits said first request packet to said destination apparatus, and
    in response to said first request packet, one of said first layer-3 apparatuses reads out said first predetermined setting data stored in a storage device of said one of said first layer-3 apparatuses, transmits said first response packet including the read first predetermined setting data to said computer, and transmits said first request packet to said destination apparatus, and
    in response to said second request packet, one of said second layer-3 apparatuses reads out said second predetermined setting data stored in said storage device of said one of second layer-3 apparatuses, transmits said second response packet including the read second predetermined setting data to said computer, and transmits said second request packet to said destination apparatus.

* * * * *